(12) United States Patent
Hecht et al.

(10) Patent No.: US 8,992,141 B2
(45) Date of Patent: Mar. 31, 2015

(54) CUTTING HEAD HAVING RESILIENT MALE COUPLING MEMBER FOR CUTTING TOOL AND METHOD OF ASSEMBLY THEREOF

(75) Inventors: Gil Hecht, Nahariya (IL); David Ben Harouche, Nahariya (IL)

(73) Assignee: Iscar, Ltd., Tefen (IL)

( * ) Notice: Subject to any disclaimer, the term of this patent is extended or adjusted under 35 U.S.C. 154(b) by 478 days.

(21) Appl. No.: 13/439,676

(22) Filed: Apr. 4, 2012

(65) Prior Publication Data

US 2013/0266390 A1    Oct. 10, 2013

(51) Int. Cl.
 *B23B 27/16*    (2006.01)

(52) U.S. Cl.
 CPC ..................................... *B23B 27/16* (2013.01)
 USPC ......................................... 408/230; 408/231

(58) Field of Classification Search
 CPC ............ B23B 51/0473; B23B 2240/00; B23B 2240/32; B23B 2251/02
 USPC .......... 408/144, 226, 227, 230, 231; 403/252, 403/253, 254
 See application file for complete search history.

(56) References Cited

U.S. PATENT DOCUMENTS

| | | | |
|---|---|---|---|
| 5,228,812 A | | 7/1993 | Noguchi et al. |
| 5,326,082 A | * | 7/1994 | Ecktman et al. ........... 267/64.27 |
| 6,783,308 B2 | * | 8/2004 | Lindblom .................... 408/230 |
| 7,048,480 B2 | | 5/2006 | Borschert et al. |
| 2010/0143059 A1 | | 6/2010 | Hecht |
| 2011/0081212 A1 | | 4/2011 | Spichtinger et al. |

FOREIGN PATENT DOCUMENTS

JP       2007245295 A  *  9/2007

OTHER PUBLICATIONS

International Search Report datred Jun. 21, 2013 issued in PCT counterpart application (No. PCT/IL2013/050200).

* cited by examiner

*Primary Examiner* — Sunil K Singh
*Assistant Examiner* — Alan Snyder
(74) *Attorney, Agent, or Firm* — Womble Carlyle

(57) ABSTRACT

A cutting head has a resilient male coupling member. The cutting head has a central resilience slit that extends between two major surfaces and opens out to the male coupling member and at least one lateral resilience slit that extends between the two major surfaces and opens out to a base surface. The central resilience slit and the at least one lateral resilience slit each have forwardmost points, located forward of the base surface. Also, a cutting tool that has a tool holder with the cutting head secured thereto. The tool holder has an insert pocket that includes a forward facing holder base abutment surface that has a female coupling member. In a locked position, the male coupling member is resiliently retained in the female coupling member. All points on the male coupling member are under deflection.

30 Claims, 4 Drawing Sheets

CUTTING HEAD HAVING RESILIENT MALE COUPLING MEMBER FOR CUTTING TOOL AND METHOD OF ASSEMBLY THEREOF

FIELD OF THE INVENTION

The subject matter of the present application relates to cutting tools of the type in which a cutting head is releasably retained in a tool holder by means of a resilient coupling mechanism.

BACKGROUND OF THE INVENTION

Cutting heads can be provided with a resilient coupling mechanism for securely fastening the cutting head in a tool holder.

Such resilient coupling mechanisms usually consist of a male coupling member on the cutting head and a female coupling member on a tool holder. There can be a resilience slit on the male coupling member that creates an interference fit when the male coupling member is forced into the female coupling member, forming a locked position.

Various cutting heads and cutting tools are disclosed in U.S. Pat. No. 5,228,812, US 2010/143059 and U.S. Pat. No. 7,048,480.

SUMMARY OF THE INVENTION

In accordance with a first aspect of the subject matter of the present application there is provided a cutting head, having a head longitudinal axis extending in a forward to rearward direction, comprising:
  a forward portion forming a cutting portion and a rearward portion forming a mounting portion;
  the mounting portion having two opposing major surfaces and a base surface extending therebetween;
  a male coupling member protruding from the base surface, the male coupling member comprising a coupling member rear surface spaced apart from the base surface and a coupling member peripheral surface extending therebetween;
  a central resilience slit extending between the two major surfaces and opening out to the male coupling member;
  at least one lateral resilience slit extending between the two major surfaces and opening out to the base surface; wherein
  the central resilience slit and the at least one lateral resilience slit have forwardmost central and lateral resilience slit points, respectively, located forward of the base surface.

In accordance with a further aspect of the subject matter of the present application, there is also provided a cutting tool comprising:
  a cutting head; and
  a tool holder, having a holder longitudinal axis extending in a forward to rearward direction, comprising an insert pocket forming a forward portion, the insert pocket comprising two pocket abutment surfaces facing in generally opposite directions and a forward facing holder base abutment surface extending therebetween, the holder base abutment surface comprising a female coupling member; wherein
  each of the two major surfaces includes a cutting head abutment surface;
  in a major side view, a base plane defined by the base surface intersects the coupling member peripheral surface at two lateralmost points thereof, defining a coupling member width; and
  the cutting tool is adjustable between a released position and a locked position, wherein:
  in the locked position:
    the male coupling member is resiliently retained in the female coupling member; and
    at least one of the pocket abutment surfaces abuts a corresponding cutting head abutment surface; wherein
  the coupling member width is smaller in the locked position than in the released position.

In accordance with a still further aspect of the subject matter of the present application, there is provided a method of assembling a cutting tool comprising the steps of:
  a) positioning the cutting head forward of the tool holder with the cutting portion facing in the forward direction and the head longitudinal axis approximately coaxial with the holder longitudinal axis;
  b) slidingly inserting the male coupling member into the female coupling member; and
  rotating the cutting head less than 90° in one direction about its head longitudinal axis from the released position to the locked position.

In accordance with a still further aspect of the subject matter of the present application, there is provided a cutting head, having a head longitudinal axis extending in a forward to rearward direction, comprising:
  a forward portion forming a cutting portion; and
  a rearward portion forming a mounting portion having:
    a base surface facing in the rearward direction and defining a base plane, and
    a pair of resilient male fixation legs extending in a forward-to-rearward direction on both sides of the base plane, the male fixation legs being separated from one another by a central resilience slit which extends forward of the base plane; wherein:
  at least one of the male fixation legs is defined:
  on an inner side thereof by the central resilience slit; and
  on an outer side thereof by an inner wall of a lateral resilience slit which extends forward of the base plane, and a peripheral surface which extends rearward of the base plane and forms a continuous surface with the inner wall of the lateral resilience slit.

BRIEF DESCRIPTION OF THE FIGURES

For a better understanding of the present application and to show how the same may be carried out in practice, reference will now be made to the accompanying drawings, in which.

Figure 1:
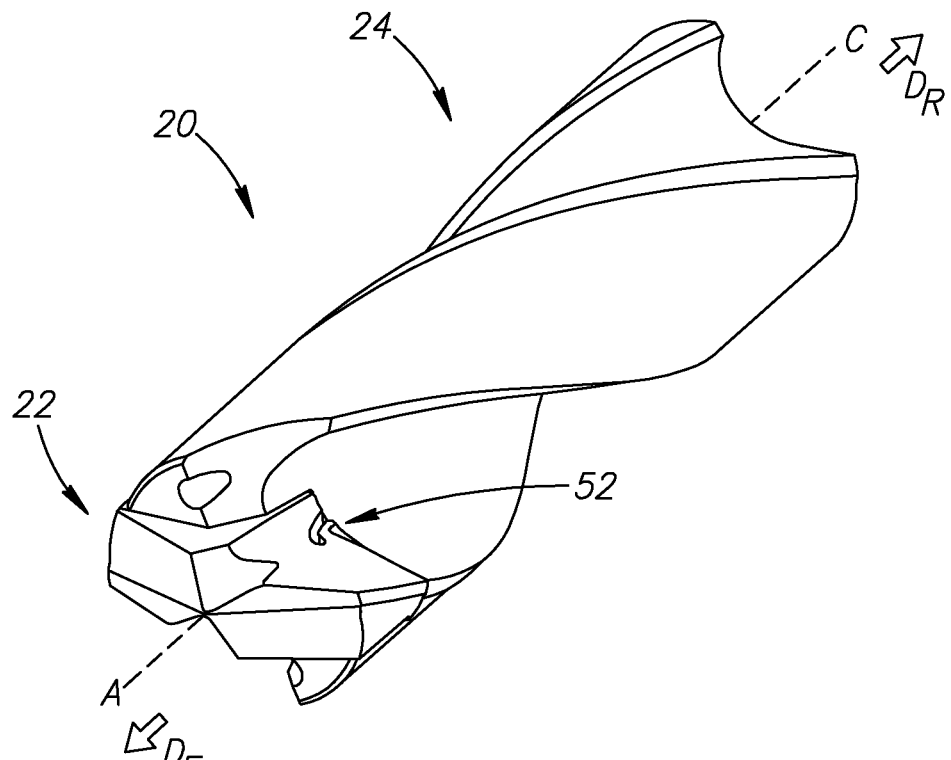
FIG. 1 is a perspective view of a cutting tool in accordance with a first embodiment of the present application.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 2:
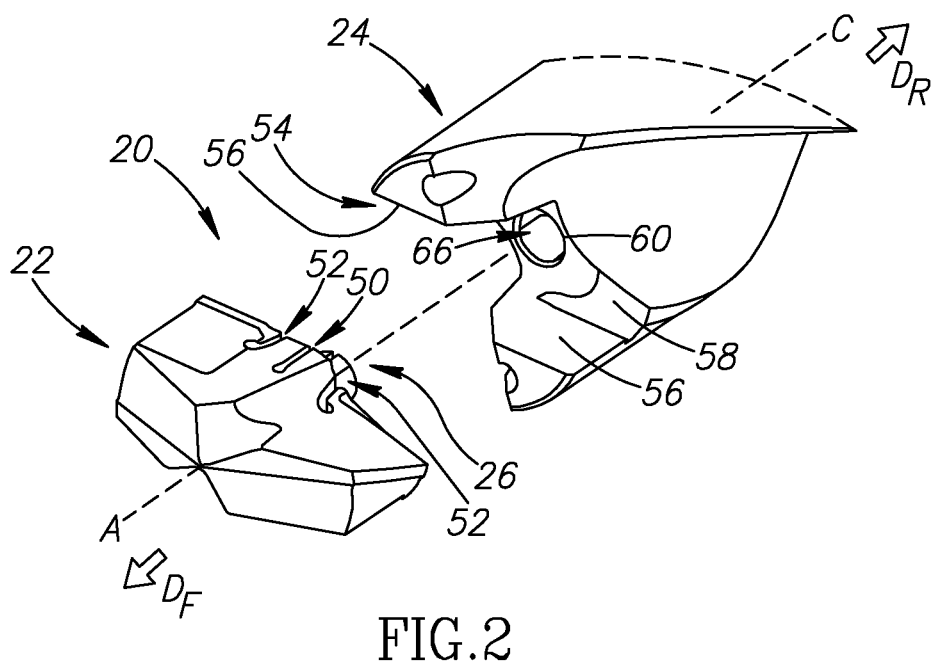
FIG. 2 is an exploded perspective view of the cutting tool shown in FIG. 1.

Attention is first drawn to FIGS. 1 and 2 showing a cutting tool 20 of the type used for drilling operations, in accordance with embodiments of the subject matter of the present application. The cutting tool 20 has a cutting head 22, 122, 222 that has a head longitudinal axis A that extends in a forward $D_F$ to rearward direction $D_R$ and a tool holder 24 that has a holder longitudinal axis C. The cutting head 22, 122, 222 can be secured in the tool holder 24 by means of a coupling mechanism.

It should be appreciated that use of the terms "forward" and "rearward" throughout the description and claims refer to a relative position in a direction of the head longitudinal axis A towards the top and bottom, respectively, in FIGS. 3, 6 to 8.

Reference is now made to FIGS. 3 to 6. The cutting head 22, 122, 222 has a forward portion that forms a cutting portion 28 and a rearward portion that forms a mounting portion 30. The mounting portion 30 has two opposing major surfaces 32 and a base surface 36 that extends therebetween.

In accordance with some embodiments of the subject matter of the present application the base surface 36 can be planar and perpendicular to the head longitudinal axis A. Whether or not the base surface 36 itself is planar, the innermost portion (s) of the base surface 36 define a base plane P2 which is perpendicular to the head longitudinal axis A.

A male coupling member 26 protrudes from the base surface 36 in the rearward direction beyond the base plane P2. The male coupling member 26 has a coupling member rear surface 42 spaced apart in the rearward direction $D_R$ from the base surface 36 and a coupling member peripheral surface 44 that extends therebetween. In accordance with some embodiments of the subject matter of the present application the male coupling member 26 can extend along a coupling member longitudinal axis B in the rearward direction $D_R$. The coupling member rear surface 42 can face in the rearward direction $D_R$. The coupling member rear surface 42 can be planar and perpendicular to the coupling member longitudinal axis B. The head longitudinal axis A and the coupling member longitudinal axis B can be co-axial. The coupling member rear surface 42 can define a rear plane P3 which is rearward of, and parallel to, the base plane P2.

A central resilience slit 50 extends between the two major surfaces 32 and opens out to the male coupling member 26. In accordance with some embodiments of the subject matter of the present application the central resilience slit 50 can open out to the coupling member rear surface 42. In a major side view, the central resilience slit 50 can have a generally constant central resilience slit width W1, where the central resilience slit width W1 is measured perpendicular to the head longitudinal axis A. The coupling member longitudinal axis B can be contained in a first plane P1 that longitudinally bisects the central resilience slit 50. In accordance with some embodiments of the subject matter of the present application, the central resilience slit 50 can bisect the male coupling member 26.

Figure 5:
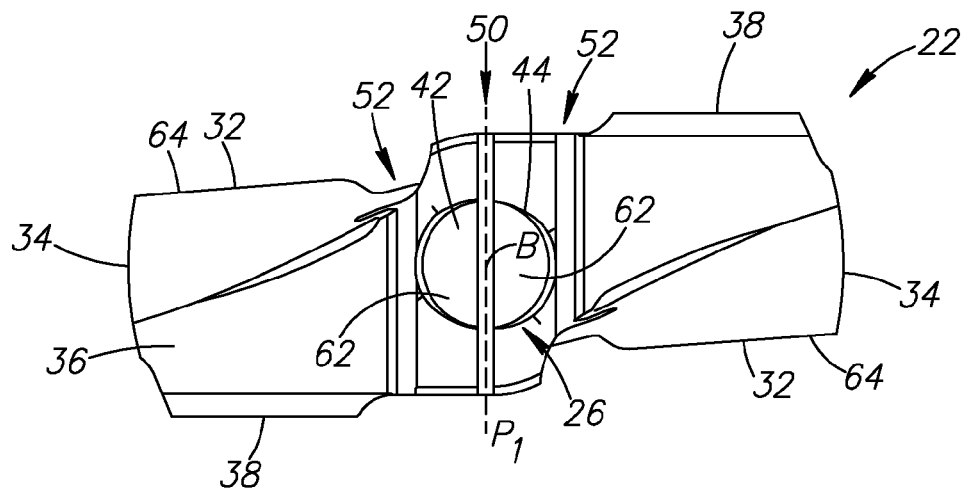
FIG. 5 is a bottom view of the cutting head shown in FIG. 3.
Figure 6:
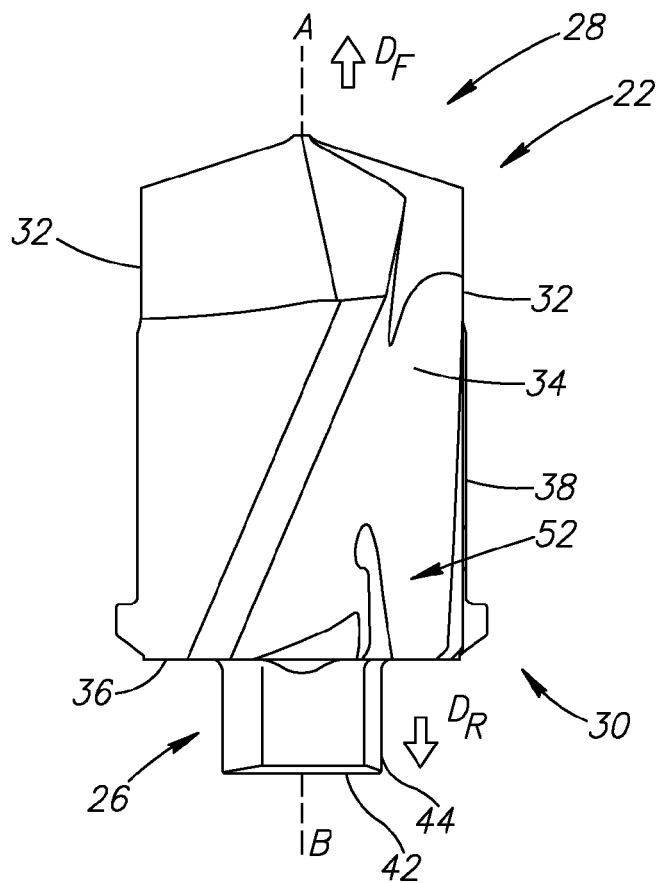
FIG. 6 is a minor side view of the cutting head shown in FIG. 3, where the cutting head is rotated 90° about a head longitudinal axis.

Referring to FIG. 5, in accordance with a first embodiment of the subject matter of the present application, the central resilience slit 50 can open out to a portion the base surface 36.

Figure 3:
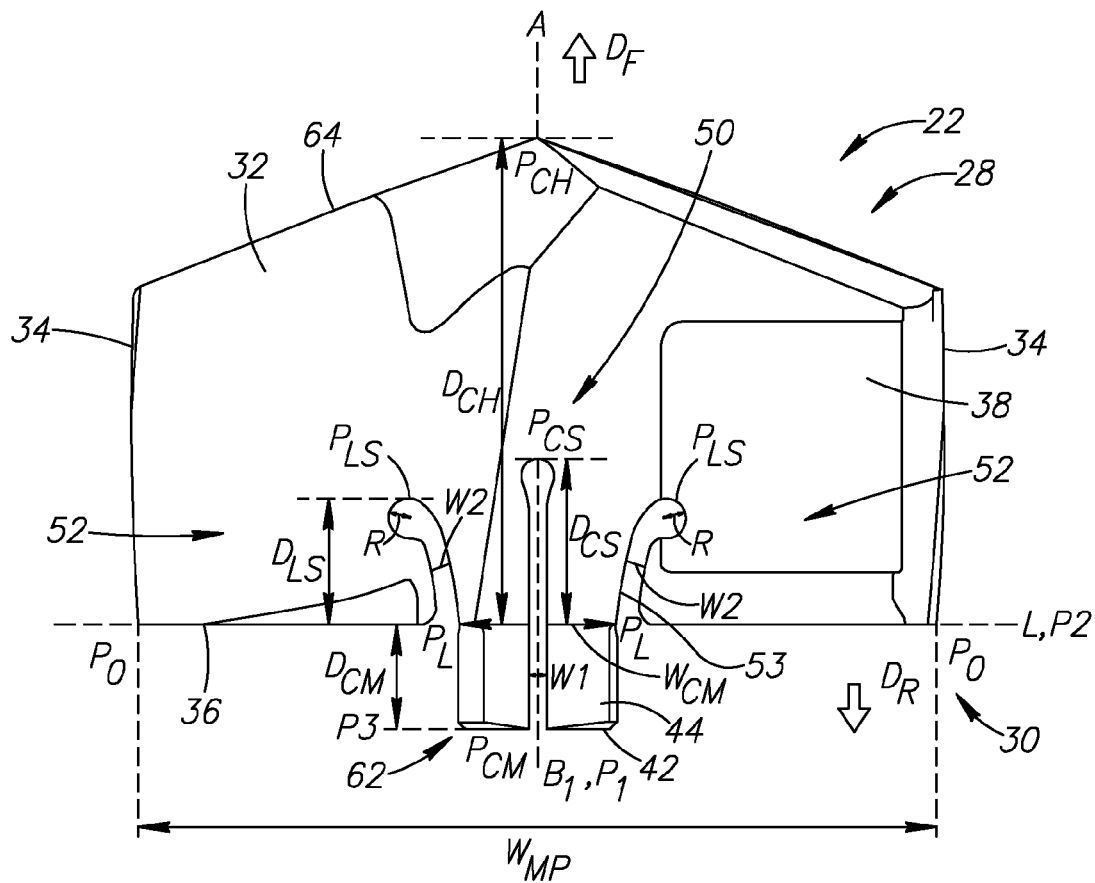
FIG. 3 is a major side view of a cutting head shown in FIGS. 1 and 2.
Figure 4:
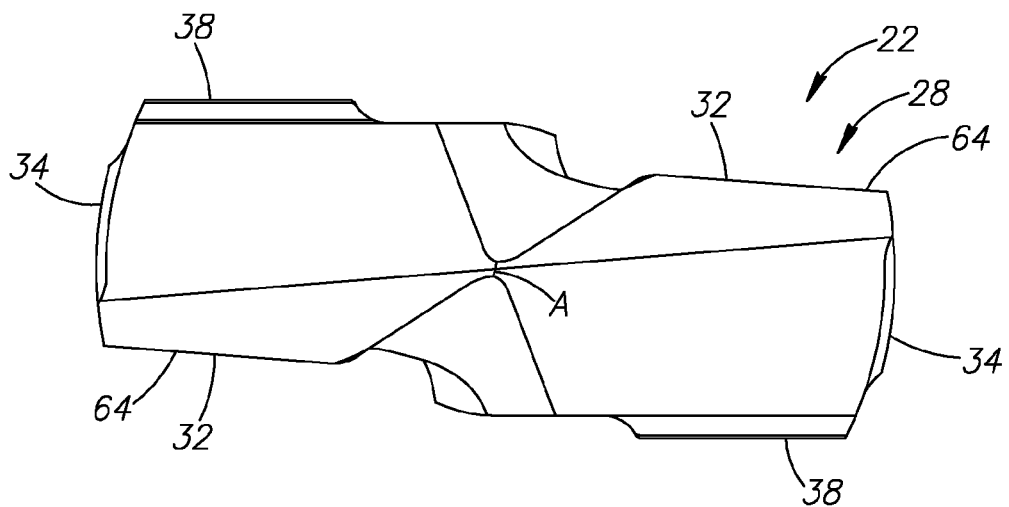
FIG. 4 is a top view of the cutting head shown in FIG. 3.
Figure 7:
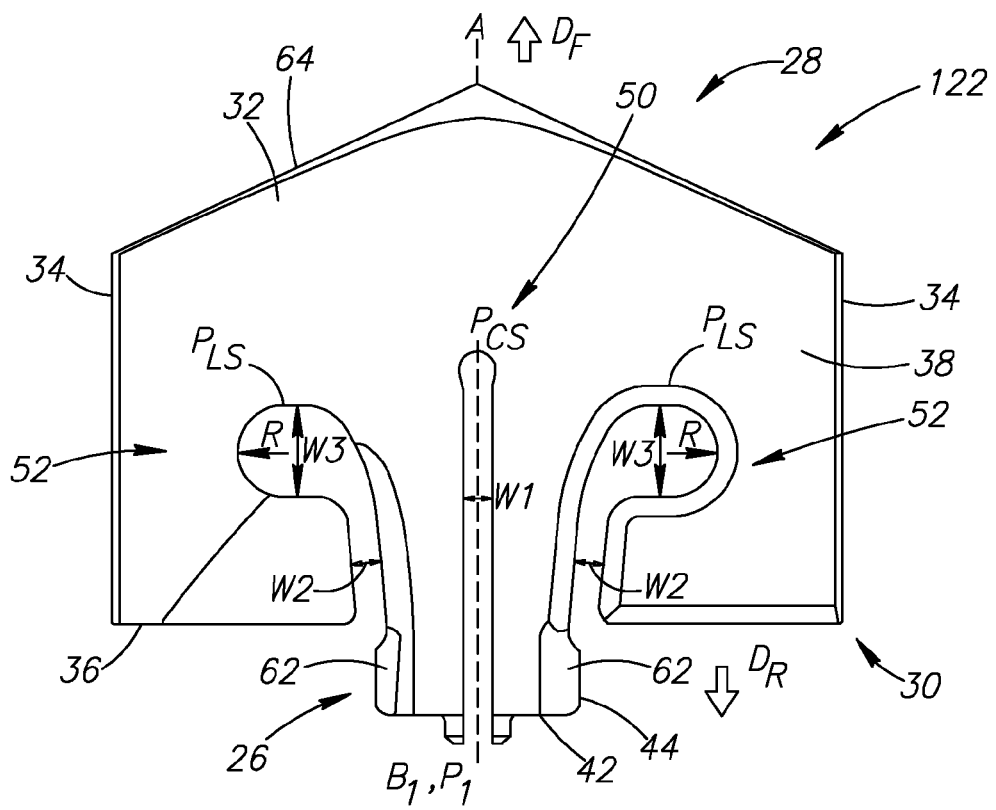
FIG. 7 is a major side view of a cutting head in accordance with a second embodiment of the present application.
Figure 8:
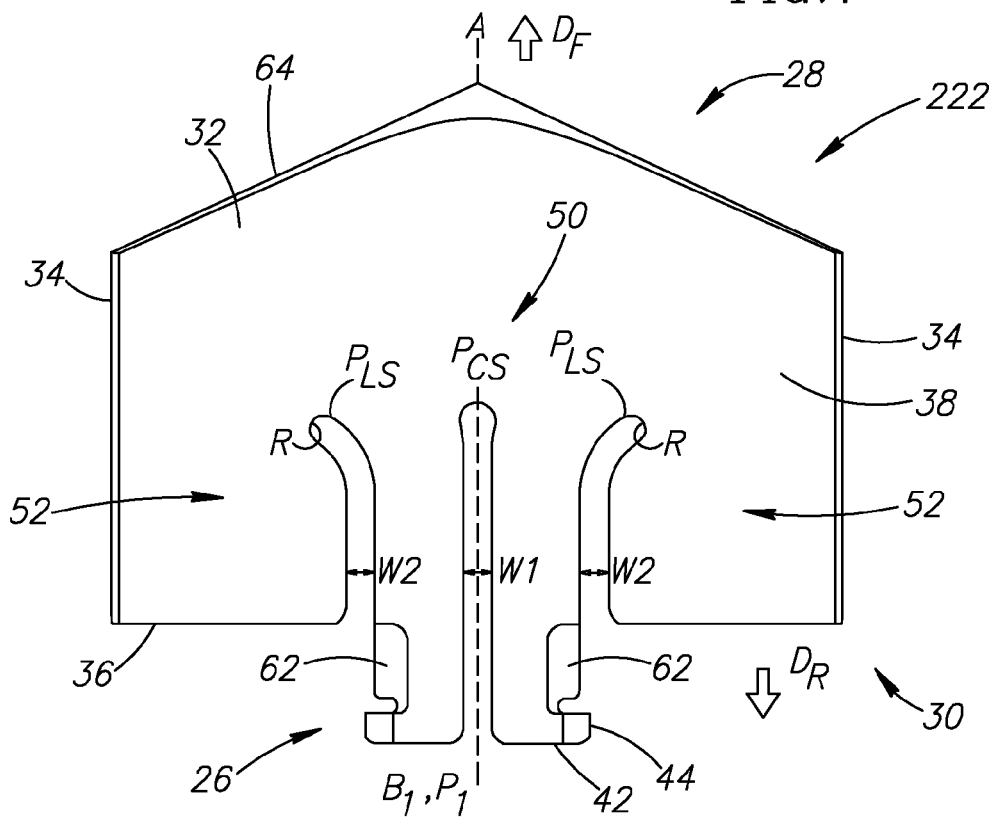
FIG. 8 is a major side view of a cutting head in accordance with a third embodiment of the present application.

It should be appreciated that use of the term "major side view" throughout the description and claims refer to a view of the cutting head 22, 122, 222 from a direction generally perpendicular to the two major surfaces 32, such as seen in FIGS. 3, 7 and 8.

At least one lateral resilience slit 52 extends between the two major surfaces 32 and opens out to the base surface 36. In accordance with some embodiments of the subject matter of the present application each of the at least one lateral resilience slit 52 can open out to the base surface 36 adjacent the male coupling member 26. A radially inner wall 53 of the lateral resilience slit 52 which extends forward of the base plane P2 forms a continuous surface with the male coupling member's peripheral surface 44 which extends rearward of the base plane P2. In a major side view, the rear portion of the at least one lateral resilience slit 52 can have a generally constant lateral resilience slit width W2. In a bottom view, as shown in FIG. 5, the central resilience slit 50 and the at least one lateral resilience slit 52 can be parallel. Each of the at least one lateral resilience slit 52 can diverge away from the central resilience slit 50 in the forward direction $D_F$.

Referring now to FIG. 8, in accordance with a third embodiment of the subject matter of the present application, in a major side view, the rear portion of the at least one lateral resilience slit 52 can be parallel to the head longitudinal axis A.

The central resilience slit 50 and the at least one lateral resilience slit 52 have forwardmost central and lateral resilience slit points $P_{CS}$, $P_{LS}$, respectively, which are located forward of the base surface 36 and/or the base plane P2. That is to say, the central resilience slit 50 has a central resilience slit point $P_{CS}$ located forward of the base surface 36 and/or the base plane P2, and the at least one lateral resilience slit 52 has a lateral resilience slit point $P_{LS}$ located forward of the base surface 36 and/or the base plane P2. In accordance with some embodiments of the subject matter of the present application each of the at least one lateral resilience slit points $P_{LS}$ can be located a lateral resilience slit distance $D_{LS}$ from the base surface 36. A rearmost coupling member point $P_{CM}$ on the male coupling member 26 can be located a male coupling member distance $D_{CM}$ from the base surface 36 and/or the base plane P2. Each lateral resilience slit distance $D_{LS}$ can be greater than the male coupling member distance $D_{CM}$. The forwardmost central resilience slit point $P_{CS}$ can be located a central resilience slit distance $D_{CS}$ from the base surface 36 and/or the base plane P2. The central resilience slit distance $D_{CS}$ can be greater than each lateral resilience slit distance $D_{LS}$. In some embodiments, the central resilience slit distance $D_{CS}$ and the lateral resilience slit distance $D_{LS}$ are typically within 50% of each other. A forwardmost cutting head point $P_{CH}$ on the cutting head 22, 122, 222 can be located a cutting head distance $D_{CH}$ from the base surface 36 and/or the base plane P2. The male coupling member distance $D_{CM}$ can be less than a third of the cutting head distance $D_{CH}$.

In accordance with first and second embodiments of the subject matter of the present application, as shown in FIGS. 3 and 7, the forward portion of the at least one lateral resilience slit 52 can have a generally circular shape that has a radius of curvature R. The radius of curvature R can be generally equal to the lateral resilience slit width W2.

Referring now just to FIG. 7, in accordance with a second embodiment of the subject matter of the present application the forward end portion of the at least one lateral resilience slit 52 can have a straight portion generally perpendicular to the head longitudinal axis A that has a straight portion width W3 generally equal to twice the radius of curvature R. The purpose of having such a configuration is to provide a space for the insertion of a locking projection (not shown) located on the tool holder 24.

In accordance with some embodiments of the subject matter of the present application there can be exactly two lateral resilience slits 52. The exactly two lateral resilience slits 52 can be disposed either side of the male coupling member 26.

By virtue of the central resilience slit 50 and the at least one lateral resilience slit 52 with the geometry and structural properties defined hereinabove, the male coupling member 26 has greater resilience compared to other prior art male coupling members.

Further in accordance with some embodiments of the subject matter of the present application the cutting head 22, 122, 222 can exhibit two-fold rotational symmetry about the head longitudinal axis A.

Another aspect of the subject matter of the present application includes the cutting tool 20. The cutting tool 20 includes the cutting head 22, 122, 222 and the tool holder 24. The tool holder 24 has the holder longitudinal axis C that extends in the forward $D_F$ to rearward direction $D_R$. The tool holder 24 has an insert pocket 54 that forms a forward portion. The insert pocket 54 includes two pocket abutment surfaces 56 facing in generally opposite directions and a forward facing holder base abutment surface 58 that extends therebetween. The holder base abutment surface 58 includes a female coupling member 60. In accordance with some embodiments of the subject matter of the present application, the two pocket abutment surfaces 56 can be parallel to the holder longitudinal axis C.

Each of the two major surfaces 32 on the cutting head 22, 122, 222 includes a cutting head abutment surface 38. In accordance with some embodiments of the subject matter of the present application the mounting portion 30 can include two opposing minor surfaces 34 that extend between the two major surfaces 32.

In a major side view, the base plane P2, and an imaginary line L that extends along the periphery of the base surface 36, intersect the coupling member peripheral surface 44 at two lateralmost points $P_L$ thereof to define a coupling member width $W_{CM}$. In accordance with some embodiments of the subject matter of the present application the imaginary line L can intersect the two minor surfaces 34 at two outermost points Po thereof, to define a mounting portion width $W_{MP}$.

In accordance with some embodiments of the subject matter of the present application the female coupling member 60 can be in the form of a coupling bore 66. The coupling bore 66 extends along the holder longitudinal axis C and can only open out to the holder base abutment surface 58. In the other words, the tool holder 24 is devoid of radially extending slits and passageways which connect to the coupling bore 66. The coupling bore 66 can be non-cylindrical.

The cutting tool 20 is adjustable between a released position and a locked position. In a released position the cutting head 22, 122, 222 is unattached to the tool holder 24. In the locked position, the male coupling member 26 is resiliently retained in the female coupling member 60. At least one of the pocket abutment surfaces 56 abuts a corresponding cutting head abutment surface 38 and functions as a driving surface to transmit torque from the tool holder 24 to the cutting head. In accordance with some embodiments of the subject matter of the present application the holder base abutment surface 58 can abut the base surface 36.

The coupling member width $W_{CM}$ is smaller in the locked position than in the released position. That is to say all points on the male coupling member 26 are under deflection. Moreover, the mounting portion width $W_{MP}$ is the same in the locked position as in the released position. That is to say no points on the mounting portion 30 are under deflection.

Another aspect of the subject matter of the present application includes a method of assembling the cutting tool 20. The cutting head 22, 122, 222 is positioned forward of the tool holder 24 with the cutting portion 28 facing in the forward direction $D_F$ and the head longitudinal axis A approximately coaxial with the holder longitudinal axis C. The male coupling member 26 is slidingly inserted into the female coupling member 60. The cutting head 22, 122, 222 is rotated less than 90° in one direction about its head longitudinal axis A from the released position to the locked position.

The male and female coupling members 26, 60 are designed to provide an interference fit in the locked position. To attach the cutting head 22, 122, 222 to the tool holder 24 the male coupling member 26 can be freely placed in the female coupling member 60 by virtue of a clearance fit. The cutting head 22, 122, 222 is then rotated about the head longitudinal axis A until an interference fit is achieved. The central resilience slit 50 and the at least one lateral resilience slit 52 provide flexibility to the male coupling member 26 which enable the width of the male coupling member 26 to be made smaller by applying a force perpendicular to the central resilience slit 50.

The male coupling member 26 has two spaced apart male fixation legs 62. On applying such a force, the two male fixation legs 62 are moved closer to each other and a resilience force is set up in the male coupling member 26 which urges the male fixation legs 62 apart to their original position. It should be appreciated that the term "male coupling member" in the present application refers to the portions of the male fixation legs 62 that protrude from the base surface 36. In other words, any point on the male fixation legs 62 that, in a major side view, is located on, or rearward of, the imaginary line L and/or base plane P2.

It can be seen from the foregoing that the male fixation legs 62 and the central resilience slit 50 both extend in a forward-to-rearward direction on both sides of the base plane P2. At least one of the male fixation legs 62 is defined on an inner side thereof (the side closest to the head longitudinal axis A) by the central resilience slit 50. At least one of the male fixation legs 62 is further defined on an outer side thereof by the inner wall 53 of the lateral resilience slit 52 which extends forward of the base plane P2, and the peripheral surface 44 which extends rearward of the base plane P2 and forms a continuous surface with the inner wall 53 of the lateral resilience slit 52. Both male fixation legs 62 can be configured as above, where the peripheral surface 44 forms a continuous surface with the inner wall 53 of the lateral resilience slit 52.

It should be noted that an advantageous feature of subject matter of the present application is that the distance between the rearmost coupling member point $P_{CM}$ on the male coupling member 26 and the base surface 36, i.e. the male coupling member distance $D_{CM}$, can be reduced, since the combination of the central resilience slit 50 and the at least one lateral resilience slit 52 that all extend forwardly in relation to the base surface 36 make the male coupling member 26 highly resilient. Having a shorter male coupling member 26 provides it with improved strength.

Another advantageous feature of subject matter of the present application is that the male coupling member 26 can be manufactured with a reduced engineering tolerance. This is by virtue of the fact that the entire male coupling member 26 is resilient and can be put under deflection.

Still another advantageous feature of subject matter of the present application is the cutting portion 28 is devoid of elastic deformation when the cutting head 22, 122, 222 is secured in the tool holder 24. This provides a cutting portion 28 with a precisely located cutting edge 64.

Still yet another advantageous feature of subject matter of the present application is the female coupling member 60 being in the form of a coupling bore 66 which only opens out to the holder base abutment surface 58. The coupling bore 66 beneficially provides a rigid and fixed boundary against which the two male fixation legs 62 can undergo deflection.

Although the subject matter of the present application has been described to a certain degree of particularity, it should be understood that various alterations and modifications could be made without departing from the spirit or scope of the invention as hereinafter claimed.

What is claimed is:

1. A cutting head (22, 122, 222), having a head longitudinal axis (A) extending in a forward ($D_F$) to rearward direction ($D_R$), comprising:
    a forward portion forming a cutting portion (28) and a rearward portion forming a mounting portion (30);
    the mounting portion (30) having two opposing major surfaces (32) and a base surface (36) extending therebetween;
    a male coupling member (26) protruding from the base surface (36), the male coupling member (26) comprising a coupling member rear surface (42) spaced apart from the base surface (36) and a coupling member peripheral surface (44) extending therebetween;
    a central resilience slit (50) extending between the two major surfaces (32) and opening out to the male coupling member (26);
    at least one lateral resilience slit (52) extending between the two major surfaces (32) and opening out to the base surface (36); wherein
    the central resilience slit (50) and the at least one lateral resilience slit (52) have forwardmost central and lateral resilience slit points ($P_{CS}$, $P_{LS}$), respectively, located forward of the base surface (36).

2. The cutting head (22, 122, 222) according to claim 1; wherein
    the coupling member rear surface (42) faces in the rearward direction ($D_R$); and
    the central resilience slit (50) opens out to the coupling member rear surface (42).

3. The cutting head (22, 122, 222) according to claim 1 wherein the male coupling member (26) extends along a coupling member longitudinal axis (B) in the rearward direction ($D_R$).

4. The cutting head (22, 122, 222) according to claim 3 wherein the coupling member rear surface (42) is planar and perpendicular to the coupling member longitudinal axis (B).

5. The cutting head (22, 122, 222) according to claim 1 wherein the at least one lateral resilience slit (52) opens out to the base surface (36) adjacent the male coupling member (26).

6. The cutting head (22, 122, 222) according to claim 1; wherein
    each of the at least one lateral resilience slit points ($P_{LS}$) is located a lateral resilience slit distance ($D_{LS}$) from the base surface (36);
    a rearmost male coupling member point ($P_{CM}$) on the male coupling member (26) is located a male coupling member distance ($D_{CM}$) from the base surface (36); and
    each lateral resilience slit distance ($D_{LS}$) is greater than the male coupling member distance ($D_{CM}$).

7. The cutting head (22, 122, 222) according to claim 6; wherein
    the forwardmost central resilience slit point ($P_{CS}$) is located a central resilience slit distance ($D_{CS}$) from the base surface (36); and
    the central resilience slit distance ($D_{CS}$) is greater than each lateral resilience slit distance ($D_{LS}$).

8. The cutting head (22, 122, 222) according to claim 6; wherein
    a forwardmost cutting head point ($P_{CH}$) on the cutting head (22, 122, 222) is located a cutting head distance ($D_{CH}$) from the base surface (36); and
    the male coupling member distance ($D_{CM}$) is less than a third of the cutting head distance ($D_{CH}$).

9. The cutting head (22, 122, 222) according to claim 1 comprising exactly two lateral resilience slits (52).

10. The cutting head (22, 122, 222) according to claim 9 wherein the exactly two lateral resilience slits (52) are disposed on either side of the male coupling member (26).

11. The cutting head (22, 122, 222) according to claim 1 wherein the head longitudinal axis (A) and the coupling member longitudinal axis (B) are co-axial.

12. The cutting head (22, 122, 222) according to claim 1 wherein the coupling member longitudinal axis (B) is contained in a first plane (P1) longitudinally bisecting the central resilience slit (50).

13. The cutting head (22, 122, 222) according to claim 1 wherein the base surface (36) is planar and perpendicular to the head longitudinal axis (A).

14. The cutting head (22, 122, 222) according to claim 1 wherein, in a major side view, the central resilience slit (50) has a generally constant central resilience slit width (W1), the central resilience slit width (W1) being perpendicular to the head longitudinal axis (A).

15. The cutting head (22, 122, 222) according to claim 1 wherein, the cutting head (22, 122, 222) exhibits two-fold rotational symmetry about the head longitudinal axis (A).

16. The cutting head (22, 122, 222) according to claim 1 wherein the at least one lateral resilience slit (52) diverges away from the central resilience slit (50) in the forward direction ($D_F$).

17. The cutting head (22, 122, 222) according to claim 1 wherein, in a major side view, the rear portion of the at least one lateral resilience slit (52) has a generally constant lateral resilience slit width (W2).

18. The cutting head (22, 122, 222) according to claim 17 wherein the forward end portion of the at least one lateral resilience slit (52) has a generally circular shape having a radius of curvature (R).

19. The cutting head (22, 122) according to claim 18 wherein the radius of curvature (R) is generally equal to the lateral resilience slit width (W2).

20. The cutting head (122) according to claim 19 wherein the forward end portion of the at least one lateral resilience slit (52) comprises a straight portion generally perpendicular to the head longitudinal axis (A) having a straight portion width (W3) generally equal to twice the radius of curvature (R).

21. The cutting head (222) according to claim 1 wherein, in a major side view, the rear portion of the at least one lateral resilience slit (52) is parallel to the head longitudinal axis (A).

22. A cutting tool (20) comprising, in combination:
    a cutting head (22, 122, 222) in accordance with claim 1; and
    a tool holder (24), having a holder longitudinal axis (C) extending in a forward ($D_F$) to rearward direction ($D_R$), comprising an insert pocket (54) forming a forward portion, the insert pocket (54) comprising two pocket abutment surfaces (56) facing in generally opposite directions and a forward facing holder base abutment surface (58) extending therebetween, the holder base abutment surface (58) comprising a female coupling member (60); wherein each of the two major surfaces (32) includes a cutting head abutment surface (38);

in a major side view, an imaginary line (L) extending along the periphery of the base surface (36) intersects the coupling member peripheral surface (44) at two lateralmost points ($P_L$) thereof, defining a coupling member width ($W_{CM}$); and the cutting tool (20) is adjustable between a released position and a locked position, wherein:

in the locked position:

the male coupling member (26) is resiliently retained in the female coupling member (60); and at least one of the pocket abutment surfaces (56) abuts a corresponding cutting head abutment surface (38); wherein the coupling member width ($W_{CM}$) is smaller in the locked position than in the released position.

23. The cutting tool (20) according to claim 22, wherein the holder base abutment surface (58) abuts the base surface (36).

24. The cutting tool (20) according to claim 22; wherein the female coupling member (60) is in the form of a coupling bore (66); and the coupling bore (66) only opens out to the holder base abutment surface (58).

25. The cutting tool (20) according to claim 24, wherein the coupling bore (66) is non-cylindrical.

26. The cutting tool (20) according to claim 22, wherein:

the mounting portion (30) comprises two opposing minor surfaces (34) extending between the two major surfaces (32); wherein in a major side view, the imaginary line (L) intersects the two minor surfaces (34) at two outermost points (Po) thereof, to define a mounting portion width ($W_{MP}$); wherein the mounting portion width ($W_{MP}$) is the same in the locked position as in the released position.

27. A method of assembling a cutting tool (20) in accordance with claim 22, the method comprising the steps of:

(a) positioning the cutting head (22, 122, 222) forward of the tool holder (24) with the cutting portion (28) facing in the forward direction ($D_F$) and the head longitudinal axis (A) approximately coaxial with the holder longitudinal axis (C);

(b) slidingly inserting the male coupling member (26) into the female coupling member (60); and (c) rotating the cutting head (22, 122, 222) less than 90° in one direction about its head longitudinal axis (A) from the released position to the locked position.

28. A cutting head (22, 122, 222), having a head longitudinal axis (A) extending in a forward ($D_F$) to rearward direction ($D_R$), comprising:

a forward portion forming a cutting portion (28); and a rearward portion forming a mounting portion (30) having:

a base surface (36) facing in the rearward direction and defining a base plane (P2), and a pair of resilient male fixation legs (62) extending in a forward-to-rearward direction on both sides of the base plane (P2), the male fixation legs (62) being separated from one another by a central resilience slit (50) which extends forward of the base plane (P2); wherein:

at least one of the male fixation legs (62) is defined:

on an inner side thereof by the central resilience slit (50); and on an outer side thereof by an inner wall (53) of a lateral resilience slit (52) which extends forward of the base plane (P2), and a peripheral surface (44) which extends rearward of the base plane (P2) and forms a continuous surface with the inner wall (53) of the lateral resilience slit (52).

29. The cutting head (22, 122, 222) according to claim 28, wherein:

the central resilience slit extends a first distance $D_{CS}$ forward of the base plane P2;

the lateral resilience slit extends a second distance $D_{LS}$ forward of the base plane P2; and the first distance and the second distance are within 50% of each other.

30. The cutting head (22, 122, 222) according to claim 28, wherein:

both of the male fixation legs (62) are defined:

on an inner side thereof by the central resilience slit (50); and on an outer side thereof by an inner wall (53) of a lateral resilience slit (52) which extends forward of the base plane (P2), and a peripheral surface (44) which extends rearward of the base plane (P2) and forms a continuous surface with the inner wall (53) of the lateral resilience slit (52).

* * * * *